Sept. 17, 1968  D. D. SHAUL  3,402,047
CRYSTALLIZATION SEPARATION AND PURIFICATION
UTILIZING FRESH FEED TO RESLURRY CRYSTALS
Filed Aug. 14, 1964
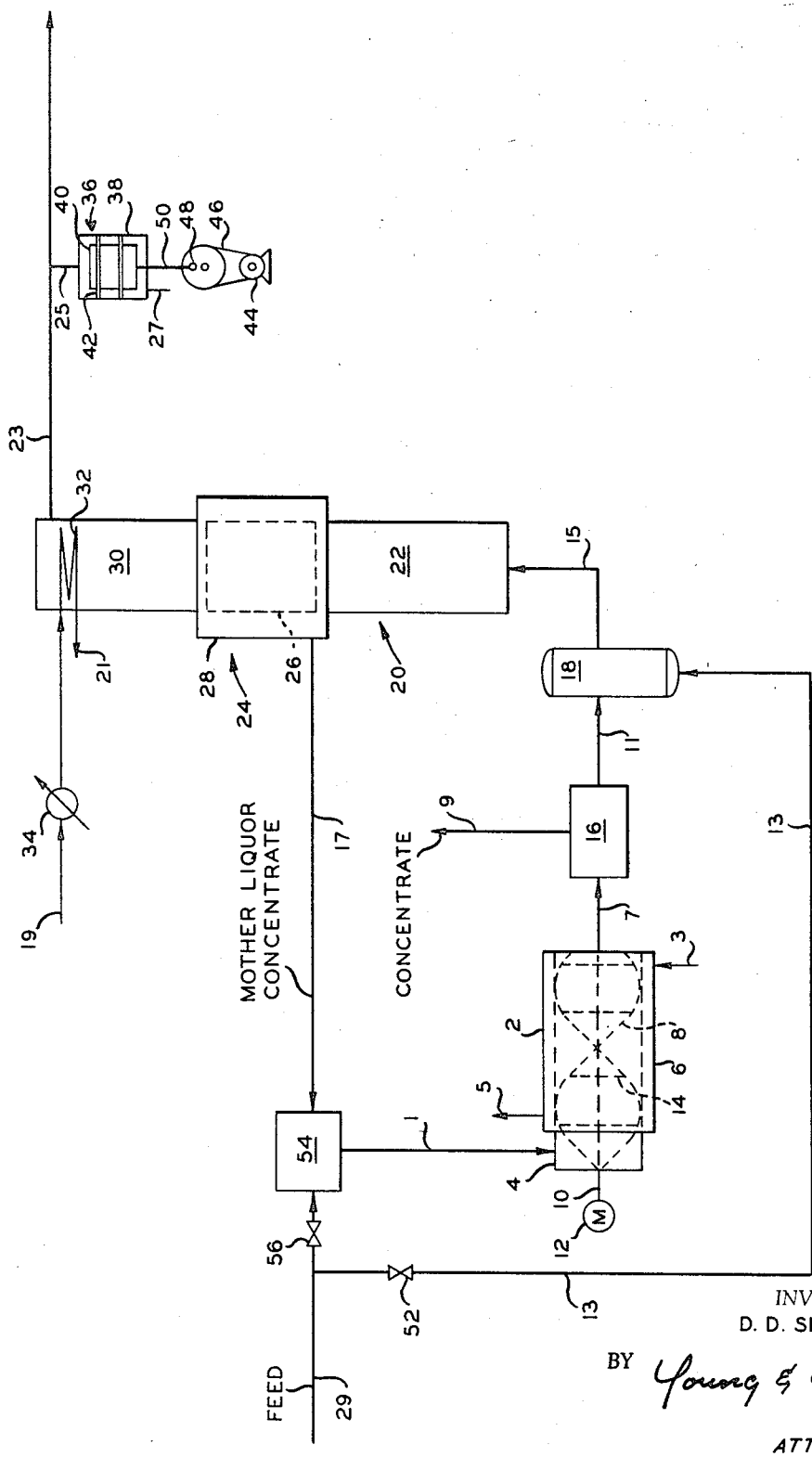
INVENTOR.
D. D. SHAUL
BY *Young & Quigg*
ATTORNEYS

United States Patent Office 3,402,047
Patented Sept. 17, 1968

3,402,047
CRYSTALLIZATION SEPARATION AND PURIFICATION UTILIZING FRESH FEED TO RESLURRY CRYSTALS
Duane D. Shaul, Bartlesville, Okla., assignor to Phillips Petroleum Company, a corporation of Delaware
Filed Aug. 14, 1964, Ser. No. 389,601
12 Claims. (Cl. 99—31)

ABSTRACT OF THE DISCLOSURE

Mother liquor concentrate from a fractional crystallization column is passed to a chiller wherein it is cooled to produce a first slurry of crystallized material. This slurry is passed to a separation vessel, such as a filter or a centrifuge, wherein the crystallized material is separated from the noncrystallized material. The separated crystallized material is reslurried with at least part of the fresh feed to the process. This second slurry is passed to the fractional crystallization column. Part of the fresh feed can be admixed with the mother liquor concentrate going to the chiller.

---

This invention relates to the separation of mixtures by crystallization.

Separations by crystallization comprises mainly three steps, i.e., (1) crystallizing at least a portion but not all of the feed mixture, (2) separating the crystallized portion from the noncrystallized portion, and (3) purifying the crystallized portion. To achieve the potential ideal pure product, the latter step might be considered the most critical in operation because complete removal of occluded materials from the crystals is required without loss in yield.

Various processes and apparatus have been developed for separating and purifying crystals. Generally, a crystal slurry is fed to an elongated column, and the mass of crystals is compacted and moved therethrough to a melt zone with the mother liquor and impurities being removed from an intermediate point in the column. A piston operated column and related process are disclosed by J. Schmidt in Re. 23,810, whereas, R. Thomas in 2,854,494 discloses a pulse operated unit and related process. Modifications to these basic processes and apparatus have employed means for separating the crystal slurry, to remove concentrated liquid, prior to introducing the crystals to the purification column. Typical modifications include Tarr, 2,885,431, which filters the slurry and then partially melts the crystal mass; McKay, 2,815,288, which filters the slurry and returns a portion of the column mother liquor to wash the filtered crystals; and Kolner, 2,886,587, which filters the slurry, melts the crystals and refreezes a portion of the melt prior to entering the purification column.

It is an object of this invention to provide improved operation of crystallization processes and apparatus.

It is another object of this invention to provide improved concentrations of the liquid separated from the crystal slurry.

It is still another object of this invention to provide for improved operation of a crystallization separation process and particularly of the crystal purification column.

Other objects, aspects and advantages of this invention will be apparent upon further study of this disclosure, the drawing and appended claims.

In accordance with this invention a portion of the feed material in a crystallization process is added to the crystals after separation from the chilled slurry but prior to entering the purification column.

Crystallization can be employed to obtain two product streams, i.e., (1) mother liquor and (2)) crystal melt; or one desired product, i.e., either mother liquor or crystal melt and a byproduct or waste stream being the other. Examples of the former are hydrocarbon mixtures being separated such as para and meta-xylene wherein para-xylene product is the crystal melt and concentrated meta-xylene product is the mother liquor; whereas the latter are aqueous systems being concentrated, such as fruit juices, with the concentrated product being mother liquor and the crystal melt being water, or an aqueous system being purified, such as salt water, with the purified water being the crystal melt and the mother liquor being the salt concentrate. When a filter is employed in the process, a concentrate product will be removed which will be similar to the mother liquor withdrawn from the column. The use of a filter or centrifuge for separation of the crystal slurry from the freezer is advantageous for high capacity removal of mother liquor from the crystals where the mother liquor is a desired product and crystal purity at that point is not critical to the separation or economics thereof. The use of the column purifies the crystals better than a filter or centrifuge and recovers the occluded mother liquor from the crystals that is not removed by filtering or centrifuging.

This invention is applicable to the resolution of a vast number of simple binary and complex multicomplex mixture systems by fractional crystallization processes and apparatus. Particularly, such systems are hydrocarbons which have practically the same boiling points and are very difficult to separate by distillation. Where the hydrocarbons are high-boiling organic compounds, separation by crystallization is required because of such compounds being unstable at distillation temperatures. Examples of nonaqueous mixtures include combinations of benzene, normal heptane, carbon tetrachloride, ethyl alcohol, cyclohexane, methyl cyclohexane, toluene, chloroform, acetone, para-xylene, other xylene isomers, ethyl benzene, and the like. This invention is also applicable to the fractional crystallization separation wherein it is desirable to recover mother liquor from the crystals as a product of the process. This situation arises where it is desired to increase the concentration of the dilute solution. For example, the invention is applicable to the production of concentrated food products which involves primarily the removal of water from these products, such as removing water from fruit junices such as grape, orange, lemon, pineapple, apple, tomato, and the like, and in the concentration of vegetable juices and other beverages such as milk, beer, wine, coffee, tea, and the like. Also, this invention is applicable to fractional crystallization separation wherein it is desirable to recover the crystals as the product of the process. This situation arises in the purification of sea water where the water freezes and the salt concentrate is the mother liquor which is discarded or used to recover salt.

This invention will now be more fully described in reference to the accompanying drawing, which illustrates diagrammatically a fractional crystallization system employing this invention.

Referring now to the drawing in detail, a feed mixture comprising two or more components, one of which is separable from the mixture by crystallization, is passed from feed tank 54 through conduit 1 into freezing zone 2. Freezing zone 2 comprises housing 4 surrounded by cooling jacket 6 having inlet 3 and outlet 5 for passage of cooling medium therethrough. Agitating or scraping means 8 are positioned within housing 4 and are designed to prevent accumulation of solid material on the inner surface of housing 4. Scraping means 8 can be constructed of strips of metal, an auger, ribbon scraper, or other suitable material and can be fabricated in the form of a helix, as shown in the drawing, or can be straight. Any form of scraping means 8 can be provided. Scraping means 8 are mounted on a rotatable shaft 10 by support members 14. Shaft 10 is axially positioned within housing 4 and is driven by motor 12. Sufficient cooling medium is circulated through jacket 6 to freeze a predetermined amount of solid crystals from the feed passing therethrough.

The resulting slurry of crystals and mother liquor produced in freezing zone 2 is passed therefrom through conduit 7 into separation zone 16. Separation zone 16 can be any suitable means for separating liquid and solids, such as, a filter of any type or a cyclone, screen, a centrifuge, etc. The concentrated liquid is removed from separation zone 16 through conduit 9. The mass of crystals from separation zone 16 is passed through suitable transporting means, such as conduit 11 as shown, and introduced into mix zone 18. A sufficient portion of fresh feed in conduit 29 is passed through conduit 13 and flow control valve 52 and introduced into mix zone 18 for forming a slurry having less than 70 weight percent solids and preferably less than 60 weight percent solids with the crystals obtained from separation zone 16. The reslurried crystals enter purification column 20 through conduit 15 into prefilter zone 22 wherein the crystal mass is compacted. The compacted crystal mass then passes through filter zone 24 comprising a suitable filter screen or medium 26 and an external shell 28, the latter being provided with an outlet conduit 17 for removal and recycle of filtrate to feed surge tank 54. Fresh feed enters tank 54 through conduit 29 and flow control valve 56, as needed. Filter medium 26 can be of various types of material. Examples of such mediums are metallic screens, sintered perforate metal members, perforate members supporting filter cloths, and the like.

After removal of the mother liquor in filter zone 24, the remaining crystal mass passes to reflux zone 30. In reflux zone 30 the crystal mass is countercurrently contacted with liquid reflux. The opposite end of the reflux zone 30 from filter 24 is a melt section having a heating element 32 therein. Heating element 32 can be in the form of a heat transfer coil (as shown) or an electrical heater. Heat exchange fluid is pumped to heat transfer coil 32 through conduit 19, heating means 34, such as an indirect heat exchanger having steam passed therethrough. The heat exchange medium is withdrawn from coil 32 through conduit 21. As the crystal mass approaches heating element 32 in the top of reflux zone 30, the crystals are melted. Part of the melt produced by heater element 32 is withdrawn through conduit 23 as a high-purity product of the process. The remainder of the melt is forced back into reflux zone 30 to form reflux which effects crystal purification. Liquid thus displaced from the crystals is drawn off through conduit 17, together with the mother liquor filtrate.

Pulsation-producing means 36 communicates with the purification column through conduits 23 and 25 to force the reflux countercurrent to the crystal flow in reflux zone 30. Pulsation-producing means 36 comprises a cylinder 38 with a reciprocable piston 40 therein. Piston 40 is suitably sealed in cylinder 38, for example, by means of rings 42, to prevent the leakage of melt from the purification zone. The reciprocation of piston 40 is produced, for example, by electric motor 44, a belt 46, a crank means 48, and connecting rod 50, which is sealed in housing 38 by means of a packing gland. An outlet 27 is provided in housing 38 to facilitate reciprocation of piston 40 and can be connected to means, not shown, for recovery of any material which might escape from the purification column in case of failure of rings 42. The reciprocation of piston 40 can be at any suitable rate, such rate being dependent upon the separation conducted in the column and the solids content maintained therein. Generally, pulsations will be produced from the reciprocation of piston 40 in the range of about 100 to about 500 pulsations per minute.

While the invention has been illustrated utilizing an indirect heat exchange freezing zone, it is within the contemplation of the invention to utilize direct heat exchange between the suitable refrigerant, such as propane, and the feed. Also, an external heater can be employed in place of the internal heating element 32 within the melt section of reflux zone 30 in the purification column. Various pumps, valves and the like which will be necessary for operations have been omitted from the drawing for clarification thereof.

As a general rule, the solids content of the mixture of feed from the separation zone entering the purification column is within the range of about 20 to about 70 weight percent, and preferably in the range of about 40 to about 60 weight percent. However, solids concentration outside the stated ranges can be used. The solids content from the freezing zone to the separation zone can be considerably greater than that passed to the purification column. The solids content at this point can range up to about 85 weight percent or the maximum that permits the transportation of the slurry.

The following comparative material balances are presented to further illustrate the invention, and show the advantages of operating crystallization purification in accordance with this invention, although it is not intended that the invention should be limited to such specific examples.

EXAMPLE

The following competitive balances are based on processing about 890 pounds per unit of time of 3.5 weight percent beer to produce beer concentrate containing 8 weight percent alcohol. Balance No. 1 shows operations in accordance with this invention with recycle of the mother liquor from the purification column to the freezing zone. Balance No. 2 shows operations with recycle of a portion of the mother liquor from the purification column to the mix zone to reslurry the crystal mass, and the remainder passed to the freezing zone. The quantities of the streams numbered as shown on the drawing as to the components is given in pounds.

BALANCE NO. 1

| | Stream (Pounds) | | | | | | | |
|---|---|---|---|---|---|---|---|---|
| | [1]1 | 7 | 9 | 11 | 13 | 15 | 17 | 23 |
| Components: | | | | | | | | |
| Water | 960 | 460 | 360 | 100 | 482.5 | 582.5 | 582.5 | |
| Alcohol | 40 | 40 | 31.3 | 8.7 | 17.5 | 26.2 | 26.2 | |
| Percent Solids | | 50 | | 82 | | 45 | | |
| Crystals | | 500 | | 500 | | 500 | | 500 as pure water. |
| Total | 1,000 | 1,000 | 391.3 | 3608.7 | 500 | 1,108.7 | 608.7 | |
| Weight Percent Alcohol in Liquid Phase | 4.0 | 8.0 | 8.0 | 8.0 | 3.5 | 4.3 | 4.3 | |

[1] Stream 1 comprises stream 17 plus 391.3 pounds fresh feed containing 377.5 pounds water and 13.8 pounds alcohol.

BALANCE NO. 2

| Components: | Stream (Pounds) | | | | | | | |
|---|---|---|---|---|---|---|---|---|
| | [1]1 | 7 | 9 | 11 | [2]13 | 15 | 17 | 23 |
| Water | 960 | 460 | 360 | 100 | 400 | 500 | 500 | |
| Alcohol | 40 | 40 | 31.3 | 8.7 | 34.8 | 43.5 | 43.5 | |
| Percent Solids | | 50 | | 82 | | 48 | | |
| Crystals | | 500 | | 500 | | 500 | | 500 as pure water. |
| Total | 1,000 | 1,000 | 391.3 | 608.7 | 434.8 | 1,043.5 | 543.5 | |
| Weight percent Alcohol in Liquid Phase | 4.0 | 8.0 | 8.0 | 8.0 | 8.0 | 8.0 | 8.0 | |

[1] Stream 1 comprises the 108.7 pounds of stream 17 being 100 pounds water and 8.7 pounds alcohol plus 886.3 pounds of fresh feed containing 855 pounds water and 31.3 pounds alcohol.
[2] Stream 13 comprises 434.8 pounds of stream 17 being 400 pounds water and 34.8 pounds alcohol.

From a comparison of the above examples, the advantages of operating a crystallization separation process in accordance with this invention are readily apparent. As compared, both balances produce 8 weight percent alcohol concentrate as the product stream. However, Balance No. 1, of the present invention, shows that performance of the purification column will be considerably improved because the crystal slurry passing thereto is of higher purity water, i.e., the crystals are easier to purify. Balance No. 1 supplies feed containing 95.7 weight percent water to the purification column whereas Balance No. 2 supplies only feed containing 92 weight percent water to the purification column. The higher purity of the feed to the column allows for improved operation for the purification of the crystals in such a column. Therefore, in actuality, more 3.5 percent beer can be processed in similar sized equipment under the scheme of Balance No. 1 than would be possible under the scheme of Balance No. 2. Thus, the improvement of the instant invention for crystal purification processes and apparatus is apparent.

The improvement in operation of the purification column in the above material balances can be explained in terms of removing the impurities, the alcohol in this case, from the ice crystals to produce 99.99 percent water as product in conduit 23. For effective operations and recovery of valuable alcohol, the column is required to obtain 99.99 percent water product. In Balance No. 1 there is about 4 percent impurities (alcohol) in the feed and the column reduces such to 0.01 percent in the water product for a reduction of about 400 fold. In Balance No. 2 there is about 8 percent impurities (alcohol) in the feed and the column reduces such to 0.01 percent in the water product for a reduction of about 800 fold. Thus, it is seen that the load on the column is reduced about 50 percent when operating in accordance with this invention.

It will be understood that various combinations of flow rates, temperatures, and pressures can be employed in fractional crystallization system dependent upon the separation to be made in the purity of the product desired.

Variations and modifications within the scope of the disclosure and the appended claims can readily be effective by those skilled in the art without departing from the spirit and scope of this invention.

That which is claimed is:

1. A process for the separation of at least one component from a liquid feed containing a mixture of a plurality of components, said at least one component being separable from said liquid feed by fractional crystallization, which comprises the steps of:
   adjusting the temperature of a first liquid mixture of said plurality of components so as to crystallize at least a portion of said at least one component but not all of the components of said first liquid mixture;
   separating the resulting crystallized material from the noncrystallized material;
   withdrawing the thus separated noncrystallized material as a product;
   admixing at least a portion of said liquid feed with the resulting separated crystallized material to form a slurry thereof;
   introducing said slurry into a purification zone;
   passing said slurry in said purification zone through a filter section, withdrawing mother liquor concentrate from said filter section, passing the crystals from said filter section to a melting section, melting at least a portion of the crystals in said melting section to form a melt, withdrawing at least a portion of the melt from said melting section as a product; and
   passing the withdrawn mother liquor concentrate to said step of adjusting the temperature as at least a portion of said first liquid mixture.

2. A process in accordance with claim 1 further comprising admixing a second portion of said liquid feed with said withdrawn mother liquor concentrate and utilizing the resulting admixture as said first liquid mixture.

3. A process in accordance with claim 1 wherein one of said plurality of components is water.

4. A process in accordance with claim 1 wherein said temperature of said first liquid mixture is adjusted to produce up to 85 weight percent crystallized material, and wherein said slurry contains from about 20 to about 70 weight percent crystallized material.

5. A process for the separation and purification of at least one component from a liquid feed containing a mixture of a plurality of components which comprises the steps of:
   introducing a first liquid mixture of said plurality of components into a heat exchange zone;
   passing a heat exchange fluid in heat exchange relation with said zone to adjust the temperature of said first liquid mixture in said zone so as to crystallize at least a portion of said at least one component but not all of the components of said first liquid mixture;
   passing the resulting crystallized material and the noncrystallized material to a separation zone and therein separating the crystallized material from the noncrystallized material;
   recovering the thus separated noncrystallized material as a product;
   passing the separated crystallized material into a mix zone;
   introducing at least a portion of said liquid feed into said mix zone to form with the crystallized material contained therein a slurry;
   passing the resulting slurry into a purification zone;
   passing said slurry in said purification zone through a filter section, withdrawing mother liquor concentrate from said filter section, passing the crystallized material from said filter section to a melting section in said purification zone and therein melting at least a portion of said crystallized material, and withdrawing at least a portion of the resulting melt as a purified product; and
   recycling said withdrawn mother liquor concentrate to said heat exchange zone as at least a portion of said first liquid mixture.

6. A process in accordance with claim 5 further comprising:
   passing a portion of said liquid feed to said heat exchange zone as the remainder of said first liquid mixture.

7. A process for the concentration of beer feedstock which comprises:
    passing a first portion of said beer feedstock to a freezing zone as a part of the material to be cooled;
    cooling said material in said freezing zone to crystallize a portion of the water contained therein;
    separating the resulting ice crystals from the noncrystallized alcohol concentrate;
    introducing an additional portion of said beer feedstock to the thus separated ice crystals to form a slurry thereof;
    introducing said slurry into a purification zone;
    passing said slurry in said purification zone to a filter section;
    withdrawing mother liquor alcohol concentrate from said filter section;
    recycling the thus withdrawn mother liquor alcohol concentrate to said freezing zone as a portion of said material to be cooled;
    continuing to pass ice crystals from said filter section through a melt section in said purification zone; and
    melting at least a portion of the ice crystals in said melt section and withdrawing at least a portion of the resulting melt from said melt section.

8. A process for the separation of at least one component from a liquid feed containing a mixture of a plurality of components, which comprises the steps of chilling a first liquid mixture of said plurality of components to crystallize at least a portion of said at least one component but not all of the components of said first liquid mixture to obtain a crystal content in the range of up to 80 weight percent; passing the resulting mixture of crystals and liquid concentrate to a separation zone, removing liquid concentrate from said separation zone as a product of the process, passing the crystals from said separation zone to a mix zone, introducing at least a portion of said liquid feed to said mix zone to form a slurry of said crystals, passing the resulting slurry to a prefilter zone in a purification column wherein said crystals in said slurry are compacted, passing the slurry of compacted crystals from said prefilter zone to a filtering zone in said purification column, withdrawing mother liquor from said crystals in said filtering zone, passing the remaining crystals from said filtering zone through a reflux zone and into a melting zone in said purification column, melting crystals in said melting zone, removing part of the resulting melt from said melting zone as a product of the process, subjecting the melt in said melting zone to a pulsating back-pressure; and passing the withdrawn mother liquor to said step of chilling as at least a portion of said first liquid mixture.

9. A process in accordance with claim 6 wherein said pulsating back-pressure comprises pulsations having a frequency in the range of 100 to 500 per second.

10. A process in accordance with claim 6 wherein said multicomponent mixture is beer.

11. Crystal purification apparatus comprising in combination a chiller having an inlet and an outlet;
    a liquid-solids separator having an inlet communicating with said outlet of said chiller, and having a liquids outlet and a solids outlet;
    a mixing vessel having a first inlet communicating with said solids outlet of said liquid-solids separator, a second inlet communicating with a source of fresh liquid feed which is to be subjected to fractional crystallization, and a slurry outlet;
    a crystal purification column having an inlet communicating with said slurry outlet of said mixing vessel, a mother liquor outlet communicating with a filter section therein, and a second outlet communicating with a melt section therein for withdrawing purified product; and
    recycle means communicating between said mother liquor outlet of said purification column and said inlet of said chiller for passing mother liquor filtrate from said filter section as at least a portion of the material passed through said inlet of said chiller.

12. The apparatus of claim 11 wherein said recycle means comprises a feed tank having an outlet communicating with said inlet of said chiller, a first inlet communicating with said mother liquor outlet of said purification column; and a second inlet communicating with said source of fresh liquid feed to provide an admixture of fresh liquid feed with said mother liquor filtrate as the input to said chiller.

References Cited
UNITED STATES PATENTS

| | | | |
|---|---|---|---|
| 2,815,288 | 12/1957 | McKay | 99—205 |
| 2,854,494 | 9/1958 | Thomas | 99—205 X |
| 2,874,199 | 2/1959 | Tarr | 99—205 X |
| 3,193,395 | 7/1965 | Tablet et al. | 99—31 X |
| 3,255,598 | 6/1966 | Cottle | 62—58 |
| 3,285,025 | 11/1966 | Shaul | 99—199 |

ALVIN E. TANENHOLTZ, *Primary Examiner.*

D. M. NAFF, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,047 September 17, 1968

Duane D. Shaul

It is certified that error appears in the above identified patent and that said Letters Patent are hereby corrected as shown below:

Column 8, lines 4 and 7, the claim reference numeral "6", each occurrence, should read -- 8 --.

Signed and sealed this 31st day of March 1970.

(SEAL)
Attest:

Edward M. Fletcher, Jr.  WILLIAM E. SCHUYLER, JR.
Attesting Officer  Commissioner of Patents